(12) United States Patent
Kajii et al.

(10) Patent No.: US 11,194,047 B2
(45) Date of Patent: Dec. 7, 2021

(54) OPTICAL MEASUREMENT DEVICE AND OPTICAL MEASUREMENT METHOD

(71) Applicant: OMRON Corporation, Kyoto (JP)

(72) Inventors: Yosuke Kajii, Ayabe (JP); Kenichi Matoba, Otsu (JP); Tomonori Kondo, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 520 days.

(21) Appl. No.: 16/162,399

(22) Filed: Oct. 17, 2018

(65) Prior Publication Data
US 2019/0219695 A1    Jul. 18, 2019

(30) Foreign Application Priority Data

Jan. 18, 2018   (JP) .............................. JP2018-006541

(51) Int. Cl.
| | |
|---|---|
| *G01C 3/08* | (2006.01) |
| *G01S 17/32* | (2020.01) |
| *G01S 7/4913* | (2020.01) |
| *G01B 11/02* | (2006.01) |

(52) U.S. Cl.
CPC ............ *G01S 17/32* (2013.01); *G01B 11/026* (2013.01); *G01C 3/08* (2013.01); *G01S 7/4913* (2013.01); *G01B 2210/50* (2013.01)

(58) Field of Classification Search
CPC ......... G01C 3/08; G01S 17/32; G01S 7/4913; G01S 2210/50; G01B 11/026
See application file for complete search history.

(56) References Cited

U.S. PATENT DOCUMENTS

| | | |
|---|---|---|
| 9,261,351 B1 | 2/2016 | Patzwald |
| 2008/0137103 A1 | 6/2008 | Torii et al. |
| 2011/0013186 A1* | 1/2011 | Miki .................. G02B 21/0064 |
| | | 356/364 |

FOREIGN PATENT DOCUMENTS

| | | |
|---|---|---|
| JP | H07229715 | 8/1995 |
| JP | 2002277207 | 9/2002 |
| JP | 2007147299 | 6/2007 |
| JP | 2011220712 | 11/2011 |
| JP | 2016161579 | 9/2016 |
| JP | 2017173159 | 9/2017 |
| JP | 02019002723 A * | 1/2019 ........... G01B 11/026 |
| TW | 200916731 | 4/2009 |
| TW | 201024683 | 7/2010 |
| TW | 201723428 | 7/2017 |

OTHER PUBLICATIONS

"Office Action of Korea Counterpart Application," with English translation thereof, dated May 27, 2019, p. 1-p. 10.
(Continued)

*Primary Examiner* — Mark Hellner
(74) *Attorney, Agent, or Firm* — JCIPRNET

(57) ABSTRACT

An optical measurement device includes: a light source, which emits light; a light reception portion, which detects a light reception amount of reflected light reflected on a target; a measurement portion, which measures a distance from the optical measurement device to the target based on the light reception amount of the reflected light; and a detection portion, which detects a portion of the target in which a light reception amount per unit time of the reflected light is smaller than a threshold value.

16 Claims, 10 Drawing Sheets

(56) References Cited

OTHER PUBLICATIONS

"Office Action of Taiwan Counterpart Application," dated Jan. 19, 2019, with English translation thereof, p. 1-p. 10.
"Search Report of Europe Counterpart Application", dated Feb. 4, 2019, p. 1-p. 7.
"Office Action of Japan Counterpart Application", dated Feb. 18, 2021, with English translation thereof, pp. 1-8.

* cited by examiner

OPTICAL MEASUREMENT DEVICE AND OPTICAL MEASUREMENT METHOD

CROSS-REFERENCE TO RELATED APPLICATION

This application claims the priority of Japan patent application serial no. 2018-006541, filed on Jan. 18, 2018. The entirety of the above-mentioned patent application is hereby incorporated by reference herein and made a part of this specification.

BACKGROUND

Technical Field

The disclosure relates to an optical measurement device and an optical measurement method.

Related Art

A kind of optical measurement device is known which includes a light reception portion configured to receive light projected by a light projection portion and output a signal corresponding to the light reception amount, a setting means configured to set a threshold value for detecting an edge position of a measurement target, and an edge extraction means configured to obtain, as a schematic edge position, a position of an intersection point of a light reception amount distribution obtained based on the output signal of the light reception portion and the threshold value set by the setting means (see patent literate 1). In the optical measurement device, a user sets the threshold value between a maximum level and a minimum level of the light reception amount distribution while viewing a display section of a monitor device, thereby obtaining the intersection point position of the light reception amount distribution and the threshold value as the schematic edge position.

[Patent literature 1] Japanese Laid-Open Publication No. 2002-277207

Here, when a distance from a device to a target is measured, for example, a distance to an end portion of the target becomes a value significantly higher than a real distance (outlier). On this occasion, there is a risk that the user of the device uses the significantly high value generated in a measured distance, namely a noise, without noticing that it is a value different from the real distance.

In order to remove the noise generated in the measured distance, conventionally, the threshold value corresponding to the light reception amount is set in advance, and when the light reception amount of reflected light from the target is lower than the threshold value at the time of measuring the distance, the measured distance is removed.

However, the light reception amount of the reflected light changes greatly according to measurement conditions, such as a measurement period of the distance, a moving speed when the device or the target moves, in addition to the type of the target. Therefore, in a conventional method, the threshold value is required to be set for each measurement condition which affects the light reception amount, and the noise, which may be generated in the measured distance at the end portion of the target, is difficult to be removed.

SUMMARY

The disclosure provides an optical measurement device and an optical measurement method, which can easily remove the noise generated in the measured distance at a portion of the target.

The optical measurement device according to one aspect of the disclosure includes: a light source, which emits light; a light reception portion, which detects a light reception amount of reflected light reflected on a target; a measurement portion, which measures a distance from the optical measurement device to the target based on the light reception amount of the reflected light; and a detection portion, which detects a portion of the target in which the light reception amount per unit time of the reflected light is smaller than a threshold value.

In addition, the optical measurement method according to another aspect of the disclosure, which is used by the optical measurement device, includes the following steps: emitting light by a light source; detecting a light reception amount of reflected light reflected on a target by a light reception portion; a measurement step measuring a distance from the optical measurement device to the target based on the light reception amount of the reflected light by a measurement portion; and detecting a portion of the target in which a light reception amount per unit time of the reflected light is smaller than a threshold value by a detection portion.

DESCRIPTION OF THE EMBODIMENTS

Figure 1:
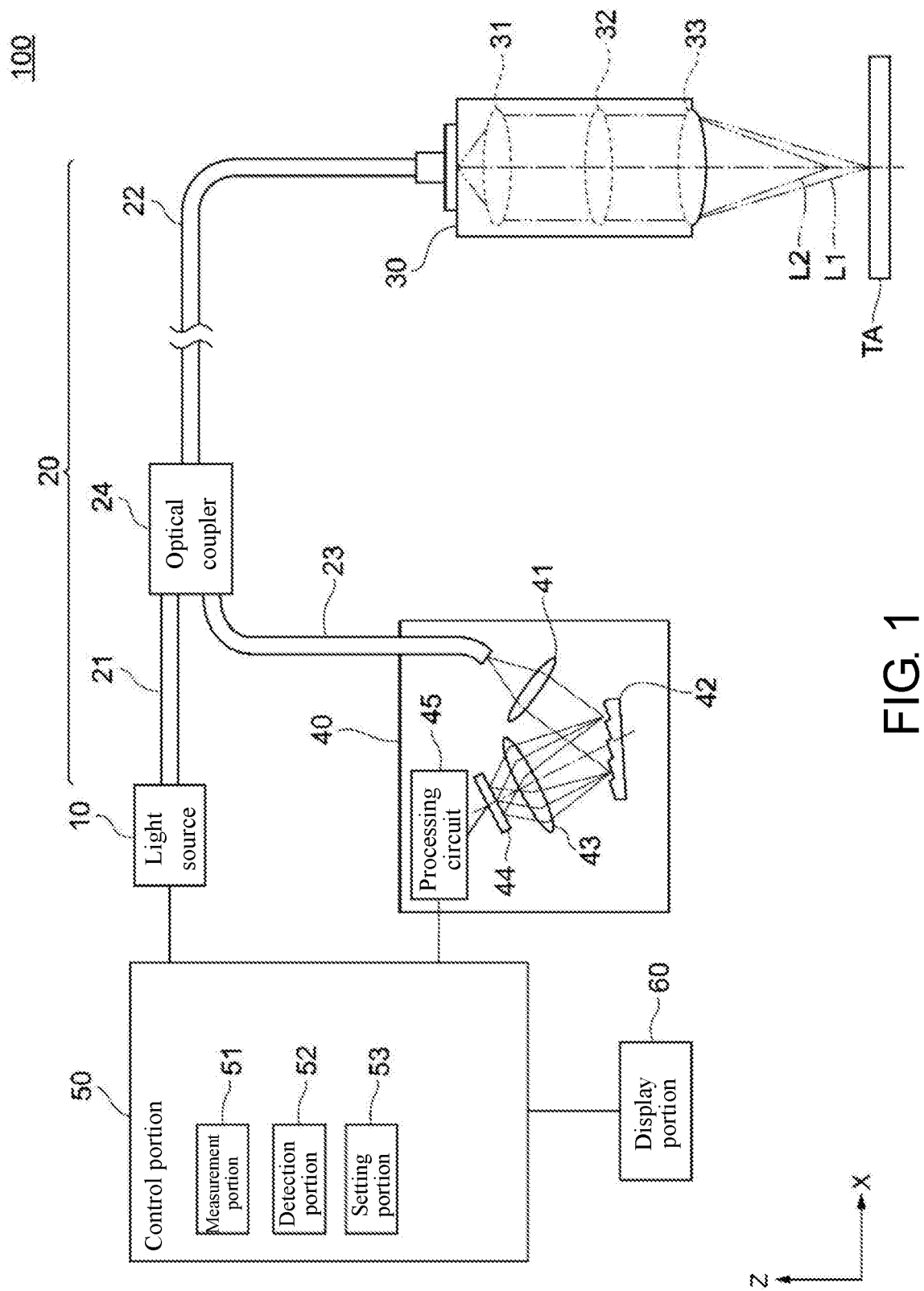
FIG. 1 is a diagram illustrating a schematic configuration of an optical measurement device of the embodiment.

According to the aspect, a portion of the target, in which the light reception amount per unit time of the reflected light is smaller than the threshold value, is detected. Here, an inventor of the disclosure found that, compared with a simple light reception amount, the light reception amount per unit time is subject to less change caused by the measurement conditions, and is a substantially fixed value for each target. Therefore, based on the light reception amount per unit time of the reflected light, the portion of the target, in which the light reception amount per unit time of the reflected light is smaller than the threshold value, can be detected without setting the threshold value for each measurement condition, and when the portion of the target is detected, the measured distance can be removed. Therefore, the noise, which may be generated in the measured distance at the portion of the target, can be easily removed.

In the above-mentioned aspect, the measurement portion may not measure the distance when the portion of the target is detected by the detection portion.

According to the aspect, the distance is not measured when the portion of the target is detected by the detection portion. Accordingly, a risk that the user uses the value of the noise which may be generated in the distance at the portion of the target can be reduced.

In the above-mentioned aspect, the light may include a plurality of wavelength components, and the optical measurement device may include an optical system which generates a chromatic aberration along an optical axis direction in the light, irradiates the light in which the chromatic aberration is generated to the target, and condenses the reflected light, and the light reception portion may be capable of detecting the light reception amount for each wavelength component.

According to the aspect, the chromatic aberration along the optical axis direction is generated in the light including a plurality of wavelength components, the light in which the chromatic aberration is generated can be irradiated to the target, the reflected light reflected on the target is condensed, and the light reception amount can be detected for each wavelength component. Accordingly, a white confocal optical measurement device removing the noise which may be generated in the measured distance at the portion of the target can be easily realized.

In the above-mentioned aspect, the measurement portion may measure the distance based on a light reception amount of a peak in the light reception amount distribution of each wavelength component of the reflected light.

According to the aspect, the distance is measured based on the light reception amount of the peak in the light reception amount distribution of each wavelength component of the reflected light. Accordingly, in the light reception amount distribution of each wavelength component of the reflected light, an influence of wavelength components except the peak on the distance can be suppressed, and the distance can be measured based on the light reception amount of the peak which focuses on the target. Therefore, the distance from the optical measurement device to the target can be measured stably with a high accuracy.

In the above-mentioned aspect, the optical measurement device may include a setting portion, which sets a threshold value based on the light reception amount per unit time of the reflected light when the portion of the target is not detected by the detection portion.

According to the aspect, the threshold value is set based on the light reception amount per unit time of the reflected light when the portion of the target is not detected. Here, the inventor of the disclosure found that, the light reception amount per unit time of the reflected light at the portion of the target is substantially fixed for each material of the target, and is a value sufficiently smaller than a light reception amount per unit time of reflected light beyond the portion of the target. Therefore, by setting the threshold value based on the light reception amount per unit time of the reflected light when the portion of the target is not detected, that is, when the reflected light are beyond the portion of the target, the portion of the target can be easily detected by comparing the threshold value with the light reception amount per unit time of the reflected light.

In the above-mentioned aspect, when the portion of the target is not detected by the detection portion, the setting portion may set $1/10$ of the light reception amount per unit time of the wavelength component of the peak in the light reception amount distribution of each wavelength component of the reflected light to be the threshold value, and the detection portion may detect the portion of the target, when the light reception amount per unit time of the wavelength component of the peak in the light reception amount distribution of each wavelength component of the reflected light is smaller than the threshold value.

According to the aspect, when the portion of the target is not detected, $1/10$ of the light reception amount per unit time of the wavelength component of the peak in the light reception amount distribution of each wavelength component of the reflected light is set to be the threshold value. In addition, when the light reception amount per unit time of the wavelength component of the peak in the light reception amount distribution of each wavelength component is smaller than the threshold value, the portion of the target is detected. Here, the inventor of the disclosure found that, in the light reception amount distribution of the reflected light on the portion of the target, the light reception amount per unit time of the wavelength component of the peak which focuses on the portion of the target is substantially fixed for each material of the target, and in the light reception amount distribution of the reflected light beyond the portion of the target, the light reception amount per unit time is a value smaller than $1/10$ of the light reception amount per unit time of the wavelength component of the peak which focuses beyond the portion. Therefore, the portion of the target can be more easily detected by setting $1/10$ of the light reception amount per unit time of the wavelength component of the peak in the light reception amount distribution of the reflected light when the portion of the target is not detected, that is, when the reflected light are beyond the portion of the target, to be the threshold value, and comparing the threshold value with the light reception amount per unit time of the wavelength component of the peak in the light reception amount distribution of the reflected light.

According to the aspect, the portion of the target is detected based on the light reception amount per unit time of the reflected light. Here, the inventor of the disclosure found that, compared with the simple light reception amount, the light reception amount per unit time is subject to less change caused by the measurement conditions, and is a substantially fixed value for each target. Therefore, based on the light reception amount per unit time of the reflected light, the portion of the target, in which the light reception amount per unit time of the reflected light is smaller than the threshold value, can be detected without setting the threshold value for each measurement condition, and the measured distance can be removed when the portion of the target is detected. Therefore, the noise which may be generated in the measured distance at the portion of the target can be easily moved.

In the above-mentioned aspect, the measurement step may include that when the portion of the target is detected by the detection portion in the step of detecting the portion of the target, the measurement portion does not measure the distance.

According to the aspect, the distance is not measured when the portion of the target is detected by the detection portion. Accordingly, the risk that the user uses the value of the noise which may be generated in the distance at the portion of the target can be reduced.

In the above-mentioned aspect, the light may comprise a plurality of wavelength components, and the optical measurement method comprises generating a chromatic aberration along the optical axis direction in the light, irradiating the light in which the chromatic aberration is generated to the target, and condensing the reflected light by an optical system; and the light reception portion may be capable of detecting the light reception amount for each wavelength component.

According to the aspect, the chromatic aberration along the optical axis direction can be generated in the light including a plurality of wavelength components, the light in which the chromatic aberration is generated can be irradiated to the target, the reflected light reflected on the target is condensed, and the light reception amount can be detected for each wavelength component. Accordingly, the white confocal optical measurement method, which removes the noise that may be generated in the measured distance at the portion of the target, can be easily realized.

In the above-mentioned aspect, the measurement step may include measuring the distance based on the light reception amount of the peak in the light reception amount distribution of each wavelength component of the reflected light by the measurement portion.

According to the aspect, the distance is measured based on the light reception amount of the peak in the light reception amount distribution of each wavelength component of the reflected light. Accordingly, in the light reception amount distribution of each wavelength component of the reflected light, an influence of wavelength components except the peak on the distance can be suppressed, and the distance can be measured based on a light reception amount of the peak which focuses on the target. Therefore, the distance from the optical measurement device to the target can be measured stably with a high accuracy.

In the above-mentioned aspect, the method includes a step of setting the threshold value based on the light reception amount per unit time of the reflected light by a setting portion, when the portion of the target is not detected by the detection portion in the step of detecting the portion of the target.

According to the aspect, the threshold value is set based on the light reception amount per unit time of the reflected light, when the portion of the target is not detected. Here, the inventor of the disclosure found that, the light reception amount per unit time of the reflected light at the portion of the target is substantially fixed for each material of the target, and is a value sufficiently smaller than a light reception amount per unit time of the reflected light beyond the portion of the target. Therefore, by setting the threshold value based on the light reception amount per unit time of the reflected light when the portion of the target is not detected, that is, when the reflected light are beyond the portion of the target, the portion of the target can be easily detected by comparing the threshold value with the light reception amount per unit time of the reflected light.

In the above-mentioned aspect, the setting step may include that when the portion of the target is not detected by the detection portion in the step of detecting the portion of the target, the setting portion sets $1/10$ of the light reception amount per unit time of the wavelength component of the peak in the light reception amount distribution of each wavelength component of the reflected light to be the threshold value; and the step of detecting the portion of the target may include that the detection portion detects the portion of the target, when the light reception amount per unit time of the wavelength component of the peak in the light reception amount distribution of each wavelength component of the reflected light is smaller than the threshold value.

According to the aspect, when the portion of the target is not detected, $1/10$ of the light reception amount per unit time of the wavelength component of the peak in the light reception amount distribution of each wavelength component of the reflected light is set to be the threshold value. In addition, when the light reception amount per unit time of the wavelength component of the peak in the light reception amount distribution of each wavelength component is smaller than the threshold value, the portion of the target is detected. Here, the inventor of the disclosure found that, in the light reception amount distribution of the reflected light on the portion of the target, the light reception amount per unit time of the wavelength component of the peak which focuses on the portion of the target is substantially fixed for each material of the target, and in the light reception amount distribution of the reflected light beyond the portion of the target, the light reception amount per unit time is a value smaller than $1/10$ of the light reception amount per unit time of the wavelength component of the peak which focuses beyond the portion. Therefore, the portion of the target can be more easily detected by setting $1/10$ of the light reception amount per unit time of the wavelength component of the peak in the light reception amount distribution of the reflected light when the portion of the target is not detected, that is, when the reflected light are beyond the portion of the target, to be the threshold value, and comparing the threshold value with the light reception amount per unit time of the wavelength component of the peak in the light reception amount distribution of the reflected light.

According to the disclosure, the optical measurement device and the optical measurement method, which can easily remove the noise that may be generated in the measured distance at a portion of the target, can be provided.

Embodiments of the disclosure are described with reference to attached drawings. Furthermore, in each diagram, components denoted with the same symbol have the same or similar configuration.

First, a configuration of an optical measurement device of the embodiments is described with reference to FIG. 1. FIG. 1 is a diagram illustrating a schematic configuration of an optical measurement device 100 of the embodiments.

As shown in FIG. 1, the optical measurement device 100 includes a light source 10, a light guiding portion 20, a sensor head 30, a light reception portion 40, a control portion 50, and a display portion 60. The optical measurement device 100 measures a distance from the device, specifically, from the sensor head 30, to a target TA at a predefined measurement period. The optical measurement device 100 can also measure a change of a distance using a certain position as a reference, that is, a displacement.

The light source 10 is configured to emit light that include a plurality of wavelength components. The light source 10 operates based on control signals input from the control portion 50, for example, changes a light amount of the light based on the control signals. The light source 10 includes, for example, a white LED (Light Emitting Diode), and generates white light. However, the light emitted by the light source 10 are not limited to white light as long as the light include a wavelength range covering a distance range required by the optical measurement device 100.

The light guiding portion 20 is configured to propagate the light. The light guiding portion 20 includes, for example, a first cable 21, a second cable 22, a third cable 23, and an optical coupler 24.

One end of the first cable 21 (a left end in FIG. 1) is optically connected to the light source 10. One end of the second cable 22 (a right end in FIG. 1) is optically connected to the sensor head 30. One end of the third cable 23 (a left end in FIG. 1) is optically connected to the light reception portion 40. Another end of the first cable 21 (a right end in FIG. 1) and another end of the third cable 23 (a right end in FIG. 1) are optically coupled with another end of the second cable 22 (a left end in FIG. 1) via the optical coupler 24.

The optical coupler 24 transmits light incident from the first cable 21 to the second cable 22, and splits light incident from the second cable 22 to transmit the light respectively to the first cable 21 and the third cable 23. Furthermore, the light that are transmitted from the second cable 22 to the first cable 21 by the optical coupler 24 are terminated in the light source 10.

The optical coupler 24 includes, for example, an optical coupler of fusion extending type (melting extending type). On the other hand, the first cable 21, the second cable 22, and the third cable 23 are configured respectively by optical fibres for example. Each optical fibre may be a single core having a single core, or may be a multi-core having a plurality of cores.

The sensor head 30 is configured to irradiate the light to the target TA. In addition, the sensor head 30 is also configured to condense reflected light from the target TA. The sensor head 30 includes, for example, a collimator lens 31, a diffraction lens 32, and an object lens 33.

The collimator lens 31 is configured to convert the light incident from the second cable into parallel light. The diffraction lens 32 is configured to generate a chromatic aberration along the optical axis direction in the parallel light. The object lens 33 is configured to collect and irradiate the light, in which the chromatic aberration is generated, to the target TA. Because the chromatic aberration in the axis is generated by the diffraction lens 32, the light irradiated from the object lens 33 focus on different distances (positions) for each wavelength.

In an example shown in FIG. 1, light L1 with a first wavelength having a relatively longer focal distance and light L2 with a second wavelength having a relatively shorter focal distance are shown. The light L1 with the first wavelength focus (connect focal points) on a surface of the target TA, and the light L2 with the second wavelength focus (connect focal points) on the front of the target TA.

The light reflected on the surface of the target TA are condensed by the collimator lens 31 through the object lens 33 and the diffraction lens 32, and incident to the second cable 22. The light L1 with the first wavelength of the reflected light focus on an edge surface of the second cable 22 which is a confocal point, and most of the light L1 with the first wavelength are incident to the second cable 22. On the other hand, the light with other wavelengths do not focus on the edge surface of the second cable 22 and are not incident to the second cable 22. One portion of the reflected light incident to the second cable 22 is transmitted to the third cable 23 and emitted to the light reception portion 40 by the optical coupler 24.

When the second cable 22 is an optical fibre, the core of the second cable 22 is equivalent to a pinhole. Therefore, by narrowing a core diameter of the optical fibre, the pinhole where the reflected light are condensed becomes smaller, and light with a wavelength that focuses on the surface of the target TA can be stably detected.

Furthermore, the sensor head 30 of the embodiment is equivalent to one example of an "optical system" of the disclosure.

The light reception portion 40 is configured to detect the light reception amount of the reflected light that are reflected on the surface of the target TA and condensed by the sensor head 30. The light reception portion 40 includes, for example, a collimator lens 41, a diffraction grating 42, an adjustment lens 43, a light reception sensor 44, and a processing circuit 45.

The collimator lens 41 is configured to convert the light incident from the third cable into parallel light. The diffraction grating 42 is configured to split (separate) the parallel light into each wavelength component. The adjustment lens 43 is configured to adjust spot diameters of the split light with different wavelengths.

The light reception sensor 44 is configured to be capable of detecting the light reception amount in each wavelength component for the split light. The light reception sensor 44 includes a plurality of light reception elements. Each light reception element is arranged one-dimensionally in correspondence with a spectral direction of the diffraction grating 42. Accordingly, each light reception element is disposed corresponding to the split light with each wavelength component. Furthermore, each light reception element can also be arranged two-dimensionally on a detection surface that includes the spectral direction of the diffraction grating 42.

Based on the control signals input from the processing circuit 45, each light reception element accumulates electrical charges according to the light reception amount of the light received in a prescribed exposure time. Besides, based on the control signals input from the processing circuit 45, each light reception element outputs electrical signals in accordance with the accumulated electrical charges outside the exposure time, that is, in a non-exposure time. Accordingly, the light reception amount received in the exposure time is converted into the electrical signals.

The processing circuit 45 is configured to control the light reception of the light reception sensor 44. In addition, the processing circuit 45 is configured to carry out a signal process for outputting the electrical signals, which are input from each light reception element of the light reception sensor 44, to the control portion 50. The processing circuit 45 includes, for example, an amplifier circuit and an A/D (Analog-to-Digital) conversion circuit. The amplifier circuit amplifies the electrical signals input from each light reception element respectively with a predefined gain. Besides, the A/D conversion circuit samples, quantizes, and encodes the amplified electrical signals of each light reception element to convert the amplified electrical signals into digital signals. Accordingly, the light reception amount detected by each light reception element is converted into a digital value.

The control portion 50 is configured to control operations of each portion of the optical measurement device 100. The control portion 50 includes, for example, a microprocessor such as a CPU (Central Processing Unit) and so on, and a memory such as a ROM (Read Only Memory), a RAM (Random Access Memory), and a buffer memory and so on. The control portion 50 includes, for example, a measurement portion 51, a detection portion 52, and a setting portion 53 as a function configuration of the control portion 50.

The measurement portion 51 is configured to measure, based on the light reception amount of the reflected light, the distance from the optical measurement device 100 to the target TA, specifically the distance from the sensor head 30 to the target TA.

In the example shown in FIG. 1, the distance is a distance in a Z-axis direction. Specifically, the measurement portion 51 obtains, from the electrical signals output by each light reception element of the light reception sensor 44, the light reception amount distribution of each wavelength component of the reflected light of the target TA. Besides, the measurement portion 51 measures the distance based on a wavelength of a peak in the light reception amount distribution.

As described above, a distance from the sensor head 30 to a point which is focused on varies with the wavelength, so that the wavelength of the peak in the light reception amount distribution obtained from the light reception sensor 44 is a wavelength of the light which are irradiated from the sensor head 30 and focus on the target TA. Besides, the wavelength corresponds to the distance from the sensor head 30 to the target TA. In the example shown in FIG. 1, the light L1 with the first wavelength which focus on the surface of the target TA appear as the wavelength of the peak of the light reception amount distribution.

A relationship (correspondence) between the wavelength and the distance is stored in advance in the memory and the like of the control portion 50. The measurement portion 51 measures, by referring to the relationship, the distance based on the wavelength components of the peak in the light reception amount distribution of the reflected light. Accordingly, in the light reception amount distribution of each wavelength component of the reflected light, an influence of the wavelength components except the peak on the distance can be suppressed, and the distance can be measured based on the wavelength component of the peak which focuses on the target TA. Therefore, the distance from the optical measurement device 100 to the target TA can be measured stably with a high accuracy.

The detection portion 52 is configured to detect the end portion of the target TA in which the light reception amount per unit time of the reflected light is smaller than a threshold value described later. The light reception amount per unit time is obtained by dividing the light reception amount by the exposure time.

Figure 2:
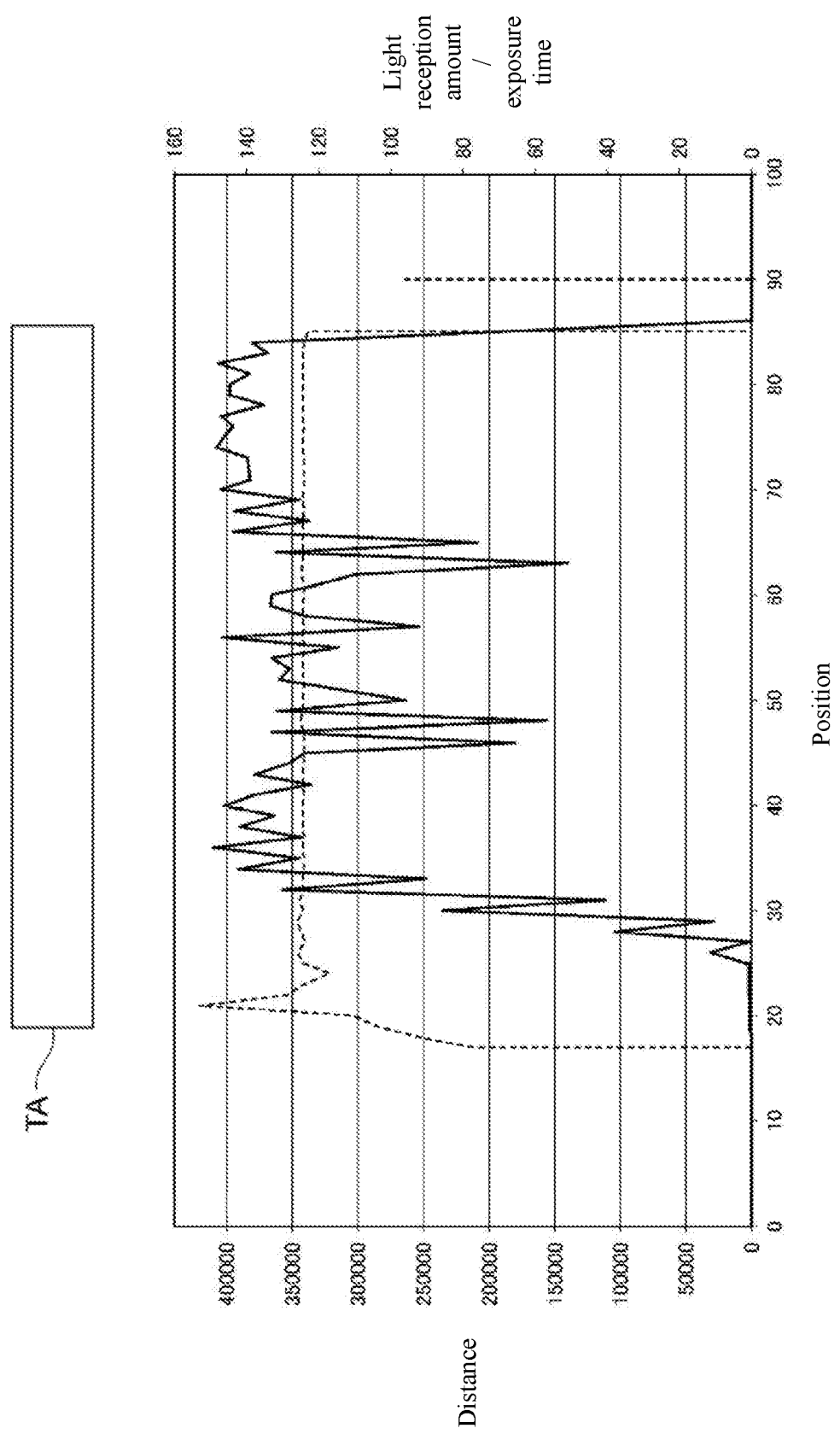
FIG. 2 is a diagram illustrating a relationship between a measured distance and a light reception amount per unit time.
Figure 3:
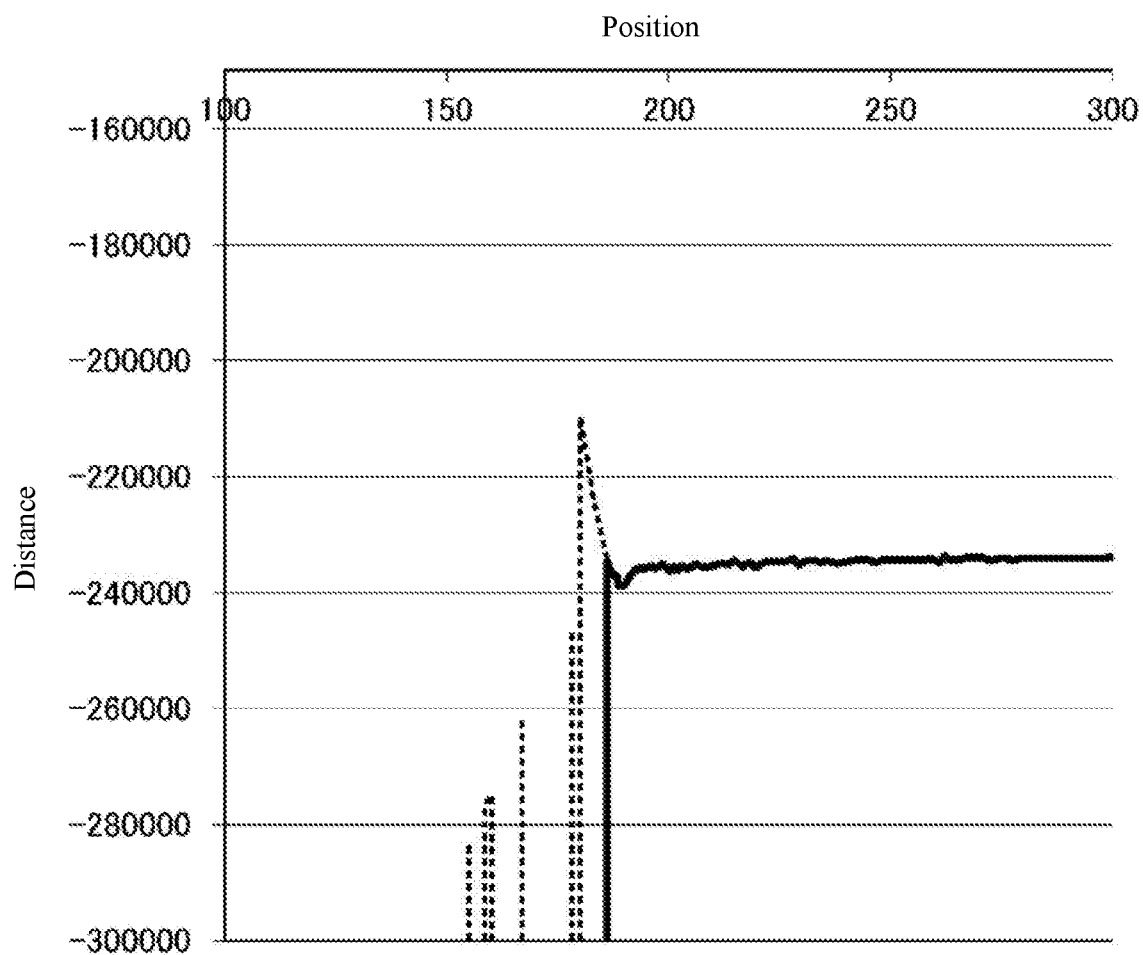
FIG. 3 is a graph illustrating a relationship between a distance measured by an optical measurement device of the embodiment and a distance measured by an optical measurement device of a conventional example.

Here, detection of the end portion of the target TA is described with reference to FIG. 2 and FIG. 3. FIG. 2 is a diagram illustrating a relationship between the measured distance and the light reception amount per unit time. In the graph of FIG. 2, a horizontal axis is a position in an X-axis direction shown in FIG. 1, one of vertical axes (a vertical axis on the left in FIG. 2) is the distance measured by the optical measurement device 100, and another vertical axis (a vertical axis on the right in FIG. 2) is the light reception amount/exposure time. FIG. 3 is a graph illustrating a relationship between the distance measured by the optical measurement device 100 of the embodiment and a distance measured by an optical measurement device of a conventional example. In FIG. 3, a horizontal axis is the position in the X-axis direction shown in FIG. 1, a vertical axis is the distance measured by the optical measurement device 100 or the optical measurement device of the conventional example. In addition, the distance in FIG. 2 and FIG. 3 is measured by moving, with respect to the target TA, the sensor head 30 or a sensor head of the conventional example in the X-axis direction shown in FIG. 1.

As shown in FIG. 2, at one of the end portions of the target TA (a left end portion in FIG. 2), a noise (outlier) is generated in the distance that is measured by the measurement portion 51 and shown by a broken line. On the other hand, the light reception amount/exposure time shown by a solid line, that is, the light reception amount per unit time is a substantially fixed value at one of the end portions. Here, the inventor of the disclosure found that, compared with the simple light reception amount, the light reception amount per unit time is subject to less change caused by the measurement conditions, and is a substantially fixed value for each target. Therefore, based on the light reception amount per unit time of the reflected light, the end portion of the target TA, in which the light reception amount per unit time of the reflected light is smaller than the threshold value, can be detected without setting the threshold value for each measurement condition, and the measured distance can be removed when the end portion of the target TA is detected. Therefore, the noise which may be generated in the measured distance at the end portion of the target TA can be easily removed.

The measurement portion 51 is configured to not measure the distance from the sensor head 30 to the target TA when the end portion of the target TA is detected by the detection portion 52. This configuration is realized, for example, by the measurement portion 51 outputting a standard value, which is "zero" in one example, without measuring the distance, when the end portion of the target TA is detected by the detection portion 52. Or the configuration is realized by the measurement portion 51 storing the measured distance in the memory and so on to leave a record but not outputting to the display portion 60, when the end portion of the target TA is detected by the detection portion 52.

As shown in FIG. 3, for the distance that is measured by the optical measurement device of the conventional example and shown by a broken line, the noise (outlier) is generated in a portion of a range. On the other hand, for the distance that is measured by the optical measurement device 100 and shown by a solid line, the distance measured by the measurement portion 51 is not displayed in the range. In this way, the measurement portion 51 does not measure the distance when the end portion of the target TA is detected by the detection portion 52, by which the risk that the user uses the value of the noise which may be generated in the distance at the end portion of the target TA can be reduced.

Returning to the description of FIG. 1, the setting portion 53 is configured to set the threshold value based on the light reception amount per unit time of the reflected light of the target TA, when the end portion of the target TA is not detected by the detection portion 52. The threshold value set by the setting portion 53 is applied, for example, to a target (referred to as "the second target" hereinafter) for which a distance is measured after the target (referred to as "the first target" hereinafter) of which the end portion is not detected by the detection portion 52, and the second target has the same material as the first target. However, the threshold value set by the setting portion 53 can also be applied to the same target as the target of which the end portion is not detected by the detection portion 52.

When the threshold value is set by the setting portion 53, the detection portion 52 may detect the end portion of the second target, when the light reception amount per unit time of the reflected light of the second target having the same material as the first target is smaller than the threshold value. Here, the inventor found that, the light reception amount per unit time of the reflected light at the end portion of the target is substantially fixed for each material of the target, and is a value sufficiently smaller than the light reception amount per unit time of the reflected light at portions beyond the end portion of the target. Therefore, by setting the threshold value based on the light reception amount per unit time of the reflected light when the end portion of the first target is not detected, that is, when the reflected light are beyond the end portion of the first target, the end portion of the second target can be easily detected by comparing the threshold value with the light reception amount per unit time of the reflected light of the second target having the same material.

In addition, the setting portion 53 can also set the threshold value based on the light reception amount per unit time of the wavelength component of the peak in the light reception amount distribution of the reflected light.

For example, when the end portion of the first target is not detected by the detection portion 52, the setting portion 53 may set 1/10 of the light reception amount per unit time of the wavelength component of the peak in the light reception amount distribution of each wavelength component of the reflected light of the first target to be the threshold value. On this occasion, when the light reception amount per unit time of the wavelength component of the peak in the light reception amount distribution of each wavelength component of the reflected light of the second target is smaller than the threshold value, the detection portion 52 may detect the end portion of the second target. Here, the inventor found that, in the light reception amount distribution of the reflected light on the end portion of the target, the light reception amount per unit time of the wavelength component of the peak which focuses on the end portion of the target is substantially fixed for each material of the target, and in the light reception amount distribution of the reflected light beyond the end portion of the target, the light reception amount per unit time is a value smaller than 1/10 of the light reception amount per unit time of the wavelength component of the peak which focuses beyond the end portion. Therefore, the end portion of the second target can be more easily detected by setting 1/10 of the light reception amount per unit time of the wavelength component of the peak in the light reception amount distribution of the reflected light when the end portion of the first target is not detected, that is, when the reflected light are beyond the end portion of the first target, to be the threshold value, and comparing the threshold value with the light reception amount per unit time of the wavelength component of the peak in the light reception amount distribution of the reflected light of the second target having the same material.

The display portion 60 is configured to display the measured distance. The display portion 60 may be further configured to display a setting content, an operation state, a communication state and so on. The display portion 60 includes, for example, a multi-digit 7 or 11-segment display, and a display lamp which emits light of a plurality of colours.

Figure 4:
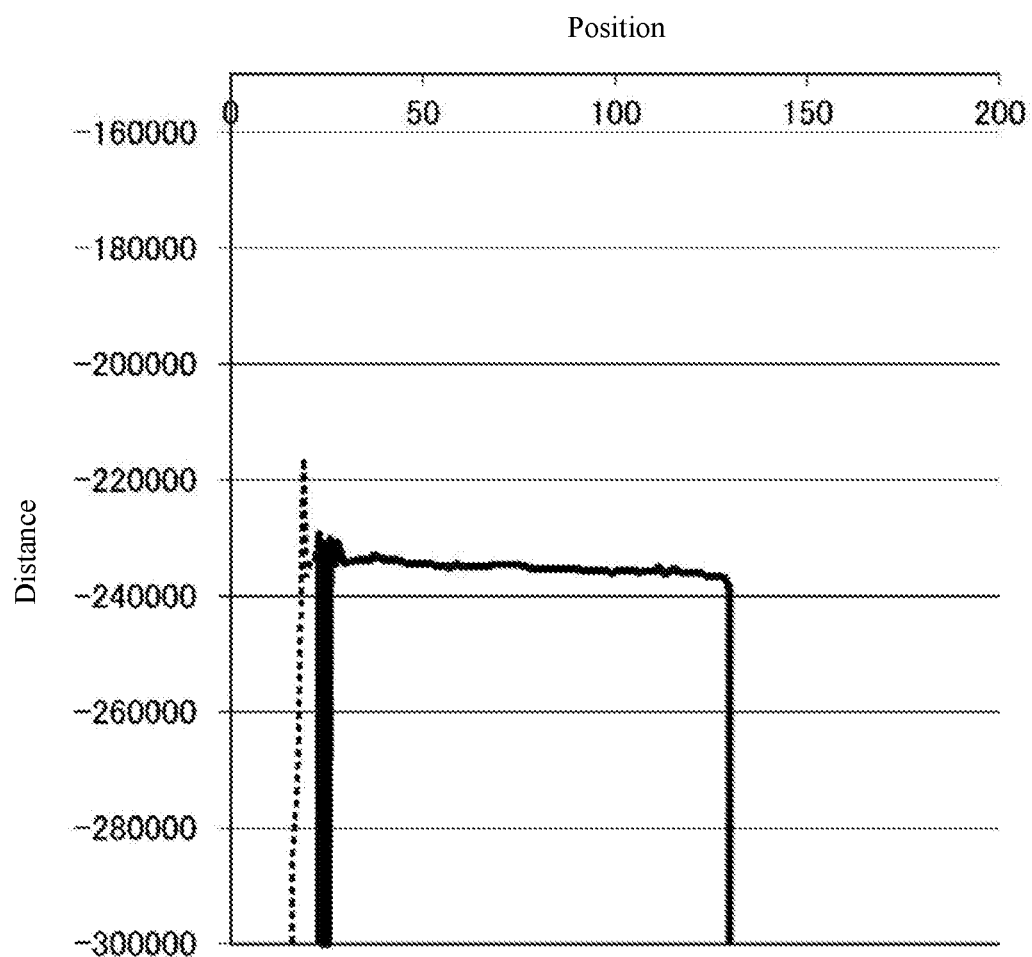
FIG. 4 is a graph illustrating a distance which is measured at a moving speed of 5 [mm/s] and a measurement period of 5 [ms] of a sensor head.
Figure 5:
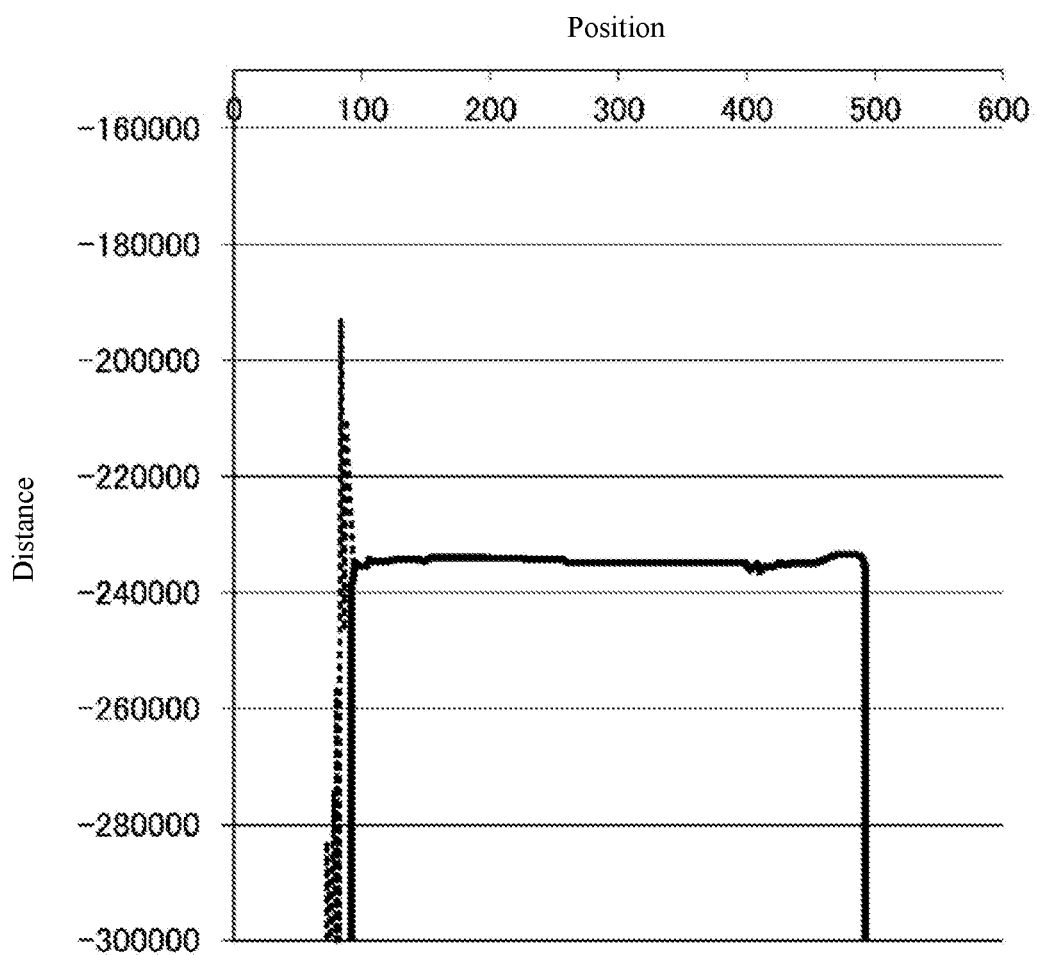
FIG. 5 is a graph illustrating a distance which is measured at a moving speed of 5 [mm/s] and a measurement period of 1 [ms] of a sensor head.
Figure 6:
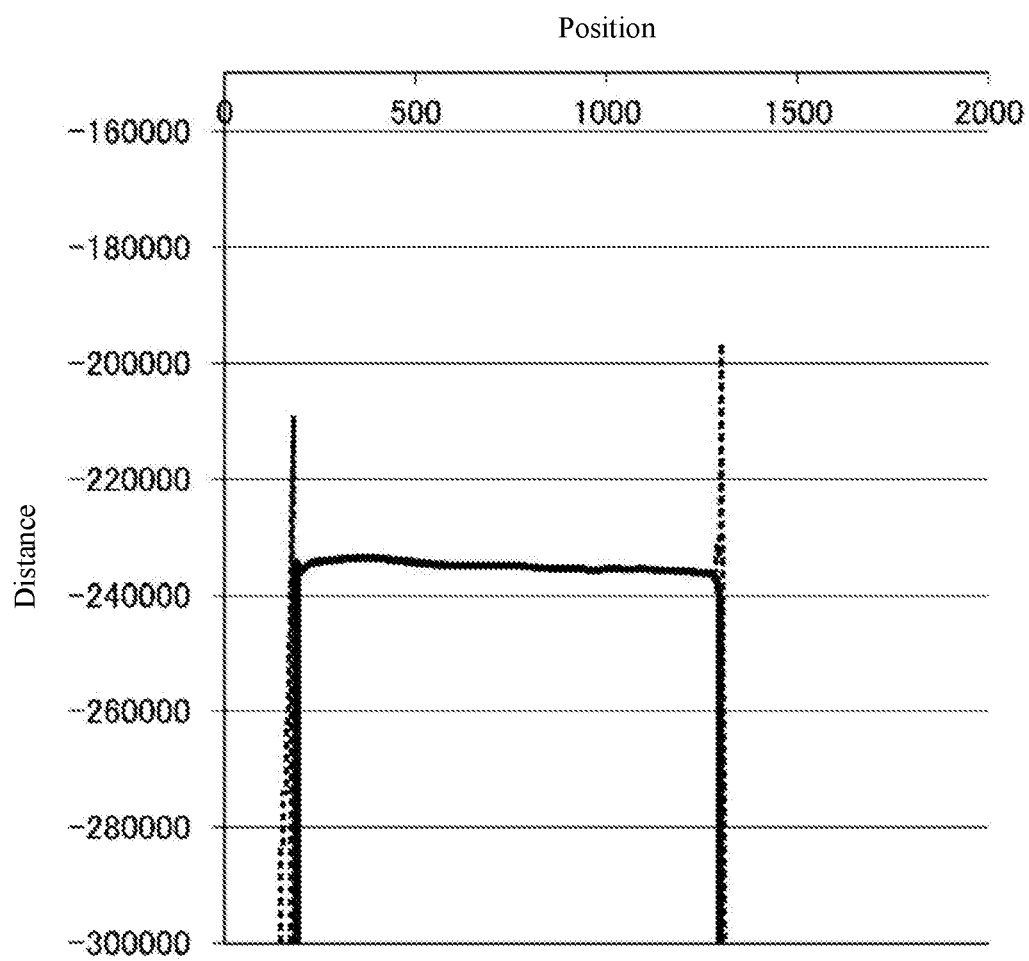
FIG. 6 is a graph illustrating a distance which is measured at a moving speed of 5 [mm/s] and a measurement period of 500 [μs] of a sensor head.
Figure 7:
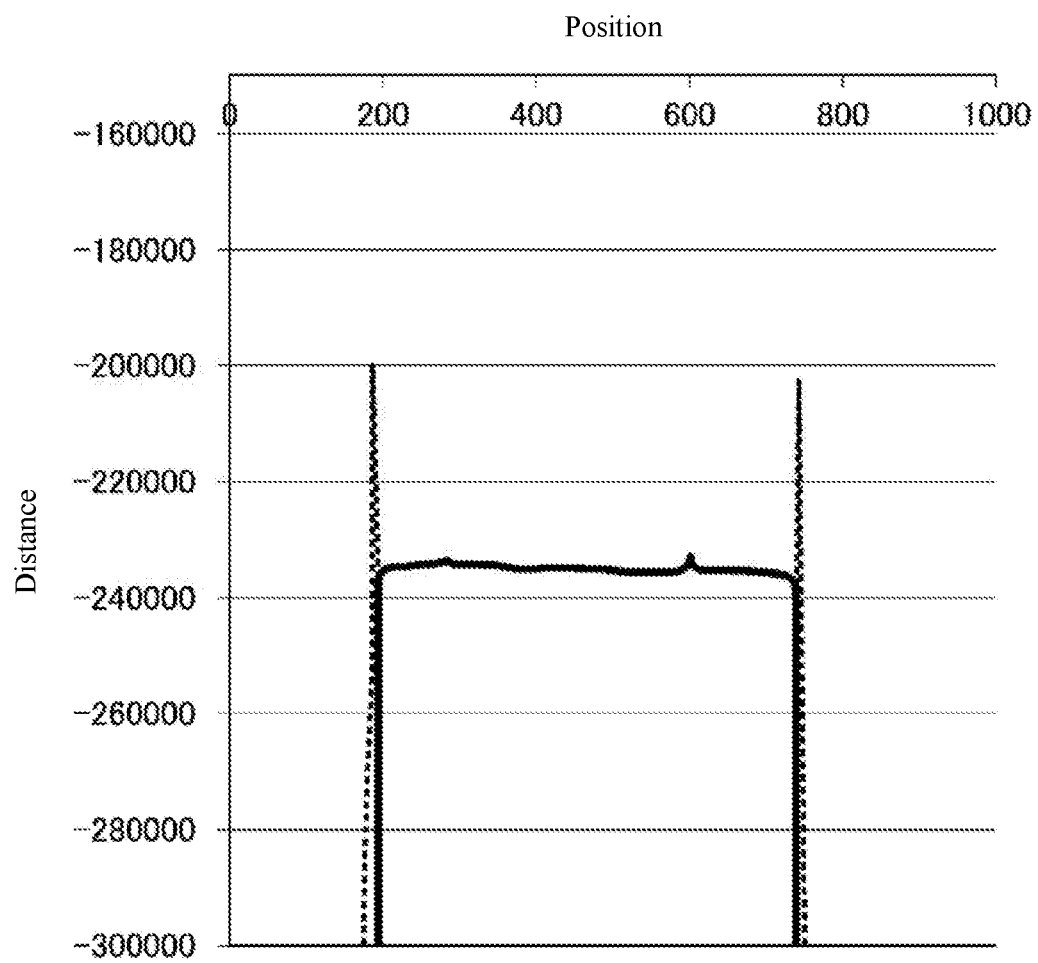
FIG. 7 is a graph illustrating a distance which is measured at a moving speed of 1 [mm/s] and a measurement period of 5 [ms] of a sensor head.
Figure 8:
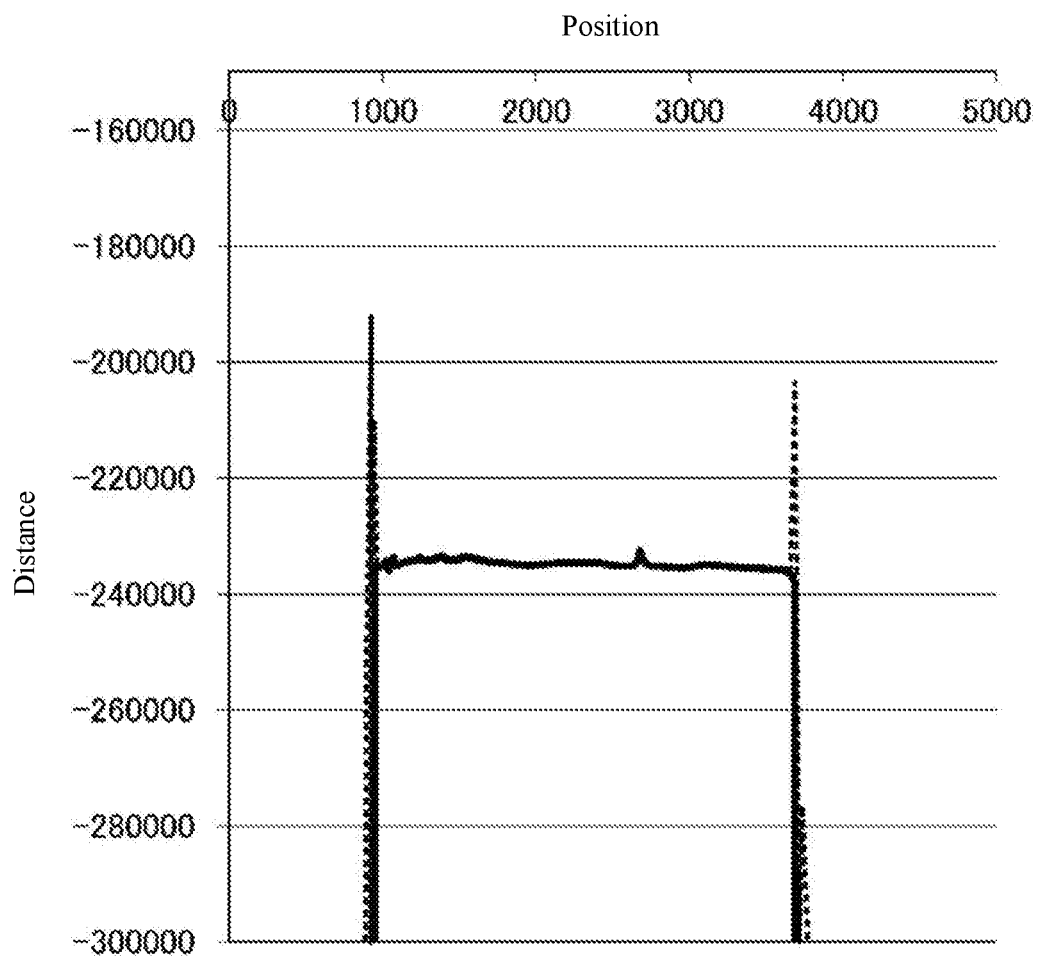
FIG. 8 is a graph illustrating a distance which is measured at a moving speed of 1 [mm/s] and a measurement period of 1 [ms] of a sensor head.
Figure 9:
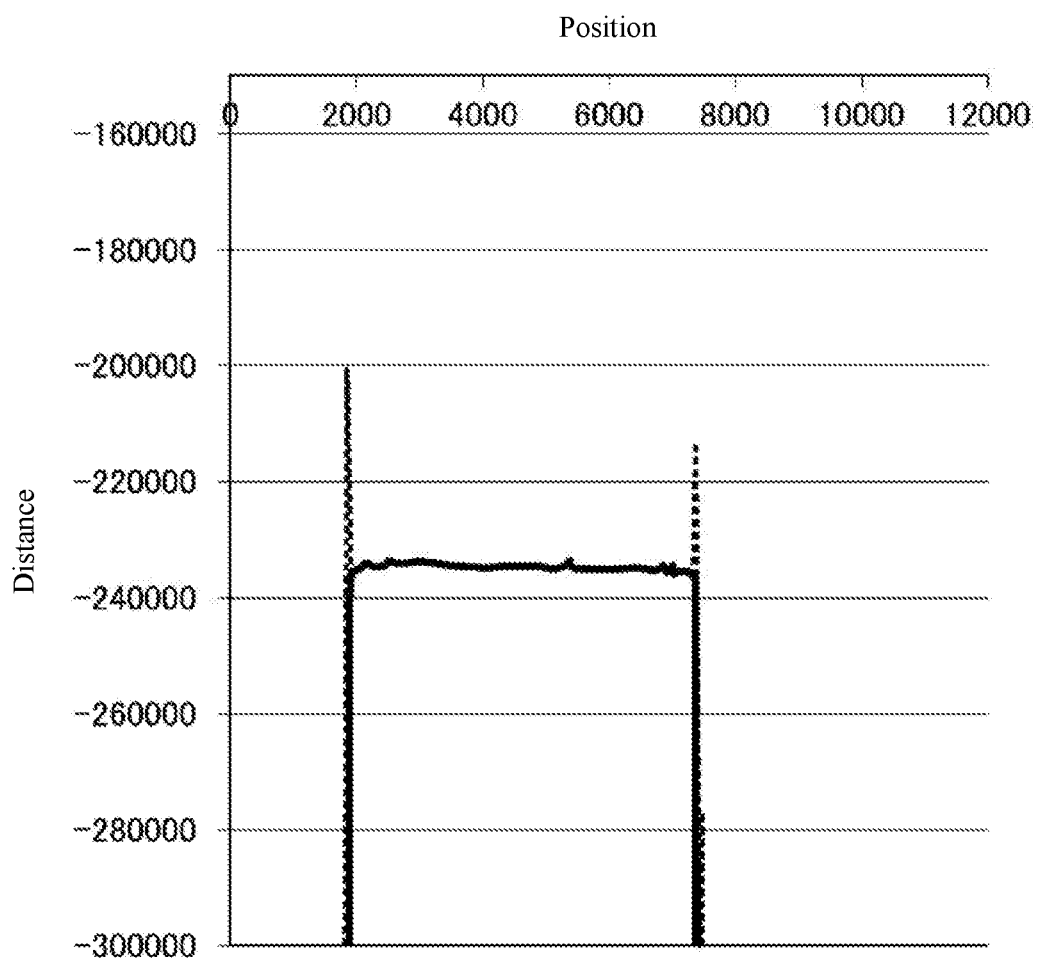
FIG. 9 is a graph illustrating a distance which is measured at a moving speed of 1 [mm/s] and a measurement period of 500 [μs] of a sensor head.

Next, with reference to FIG. 4 to FIG. 9, measurement results of the optical measurement device 100 under a plurality of different measurement conditions are described. FIG. 4 is a graph illustrating a distance which is measured at a moving speed of 5 [mm/s] and a measurement period of 5 [ms] of the sensor head 30. FIG. 5 is a graph illustrating a distance which is measured at a moving speed of 5 [mm/s] and a measurement period of 1 [ms] of the sensor head 30. FIG. 6 is a graph illustrating a distance which is measured at a moving speed of 5 [mm/s] and a measurement period of 500 [μs] of the sensor head 30. FIG. 7 is a graph illustrating a distance which is measured at a moving speed of 1 [mm/s] and a measurement period of 5 [ms] of the sensor head 30. FIG. 8 is a graph illustrating a distance which is measured at a moving speed of 1 [mm/s] and a measurement period of 1 [ms] of the sensor head 30. FIG. 9 is a graph illustrating a distance which is measured at a moving speed of 1 [mm/s] and a measurement period of 500 [μs] of the sensor head 30. In each diagram, a horizontal axis is the position in the X-axis direction shown in FIG. 1, and a vertical axis is the distance measured by the optical measurement device 100. In addition, a moving direction of the sensor head 30 is the X-axis direction shown in FIG. 1, and the target TA is configured by stainless (SUS) as the material. Furthermore, for the sake of comparison, the distance measured by the optical measurement device of the conventional example is shown by a broken line.

As shown in FIG. 4 to FIG. 9, for the distance which is measured by the optical measurement device of the conventional example and shown by a broken line, a noise (outlier) is generated, under each measurement condition, in a portion of a range which is considered as the end portion of the target. In contrast, the distance which is measured by the optical measurement device 100 and shown by a solid line is not measured in the range. In FIG. 4 to FIG. 9, the distance of the target TA all having the same material is measured, so that the detection portion 52 detects the end portion of the target TA using the same threshold value set by the setting portion 53 even under different measurement conditions.

Figure 10:
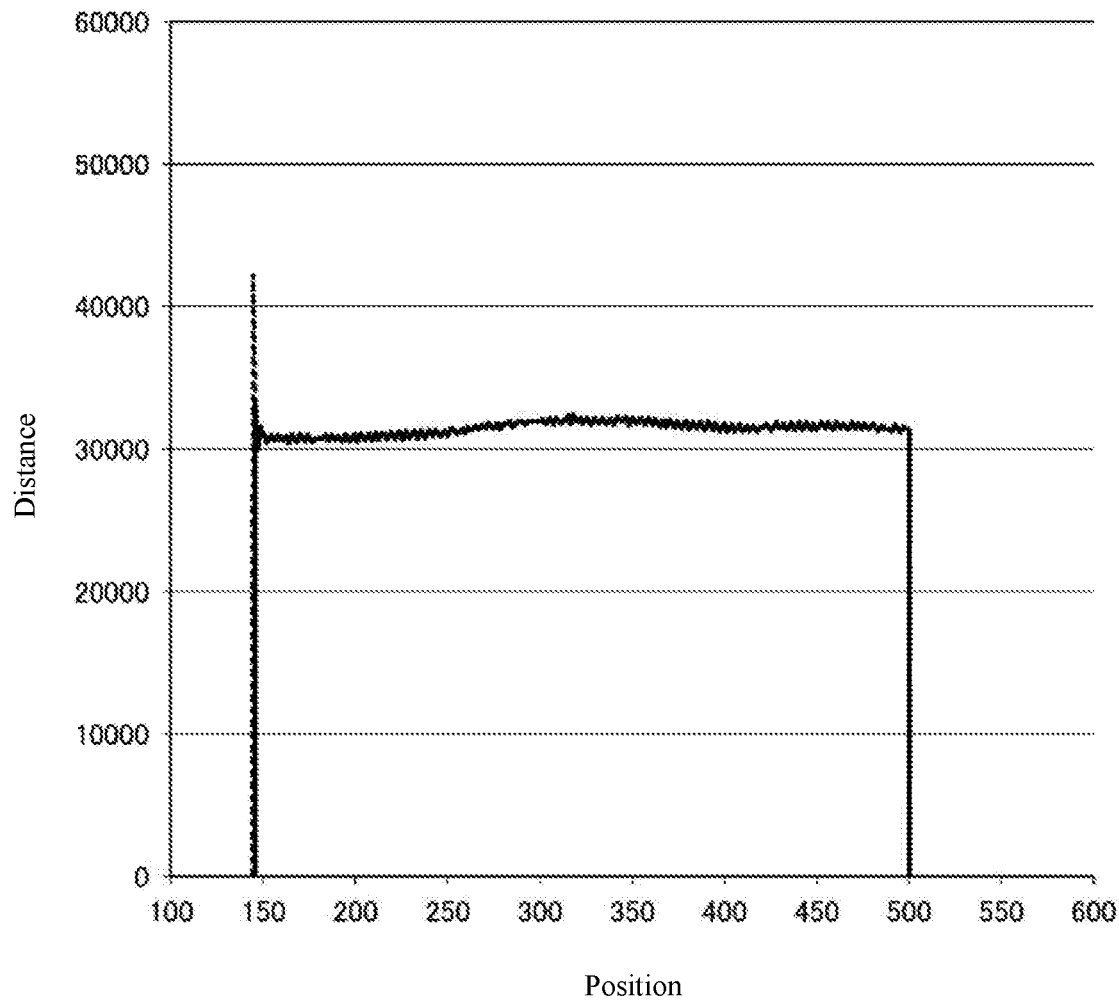
FIG. 10 is a graph illustrating a distance which is measured at a moving speed of 5 [mm/s] and a measurement period of 5 [ms] of a sensor head.

Next, a measurement result of the optical measurement device 100 for the target TA of a different material is described with reference to FIG. 10. FIG. 10 is a graph illustrating a distance which is measured at a moving speed of 5 [mm/s] and a measurement period of 5 [ms] of the sensor head 30. That is, FIG. 10 is a graph measured under the same measurement condition as the above-mentioned FIG. 4. In FIG. 10, a horizontal axis is the position in the X-axis direction shown in FIG. 1, and a vertical axis is the distance measured by the optical measurement device 100. In addition, the moving direction of the sensor head 30 is the X-axis direction shown in FIG. 1, and the target TA is configured by glasses as the material. Furthermore, for the sake of comparison, the distance which is measured by the optical measurement device of the conventional example is shown by a broken line.

As shown in FIG. 10, for the distance which is measured by the optical measurement device 100 and shown by a solid line, similar to FIG. 4 to FIG. 9, the distance is not measured in the range considered as the end portion of the target. In FIG. 10, the distance of the target TA having a material different from the examples in FIG. 4 to FIG. 9 is measured, so that the setting portion 53 sets a threshold value different from the examples in FIG. 4 to FIG. 9. The detection portion 52 detects the end portion of the target TA using the threshold value different from the examples in FIG. 4 to FIG. 9.

In the embodiment, an example is shown in which the detection portion 52 detects the end portion of the target TA, but the disclosure is not limited thereto. The detection portion 52 can also detect, for example, unevenness, scratches or the like of the target TA as long as the light reception amount per unit time of the reflected light is smaller than the threshold value in this portion of the target TA.

In addition, in the embodiment, an example is shown in which the optical measurement device 100 is a white confocal device, but the disclosure is not limited thereto. The optical measurement device may be, for example, a triangulation type of device. On this occasion, the optical measurement device may include a light source which emits light, a light reception portion which detects the light reception amount of the reflected light reflected on the target TA, a measurement portion which measures the distance from the optical measurement device to the target TA based on the light reception amount of the reflected light, and a detection portion which detects the end portion of the target in which the light reception amount per unit time of the reflected light is smaller than the threshold value.

As described above, in the embodiment, the end portion of the target in which the light reception amount per unit time of the reflected light is smaller than the threshold value is detected. Here, the inventor of the disclosure found that, compared with the simple light reception amount, the light reception amount per unit time is subject to less change caused by the measurement conditions and is a substantially fixed value for each target. Therefore, based on the light reception amount per unit time of the reflected light, the portion of the target TA in which the light reception amount per unit time of the reflected light is smaller than the threshold value can be detected without setting the threshold value for each measurement condition, and the measured distance can be removed when the end portion of the target TA is detected. Therefore, the noise which may be generated in the measured distance in a portion of the target TA can be easily removed.

The embodiments described above are used to facilitate the understanding on the disclosure, and are not used to interpret the disclosure in a limitative way. Each element included in the embodiment and the arrangement, material, condition, shape, size and so on of the element are not limited to the illustrated examples and can be appropriately changed. In addition, configurations shown in different embodiments can be partially replaced or combined with one another.

(Appendix)

1. An optical measurement device 100, including:
a light source 10, which emits light;
a light reception portion 40, which detects a light reception amount of reflected light reflected on a target TA;
a measurement portion 51, which measures a distance from the optical measurement device 100 to the target TA based on the light reception amount of the reflected light; and
a detection portion 52, which detects a portion of the target TA in which the light reception amount per unit time of the reflected light is smaller than a threshold value.

7. An optical measurement method, which is used by an optical measurement device 100, including the following steps:
emitting light by a light source 10;
detecting a light reception amount of reflected light reflected on a target TA by a light reception portion 40;
a measurement step, measuring a distance from the optical measurement device 100 to the target TA based on the light reception amount of the reflected light by a measurement portion 51; and
detecting a portion of the target TA in which the light reception amount per unit time of the reflected light is smaller than a threshold value by a detection portion 52.

What is claimed is:

1. An optical measurement device, comprising:
a light source, which emits light;
a light reception portion comprising a light reception sensor, which detects a light reception amount of reflected light reflected on a target;
a distance detector, which measures a distance from the optical measurement device to the target based on the light reception amount of the reflected light; and
a light detector, which detects a portion of the target in which the light reception amount per unit time of the reflected light is smaller than a threshold value,
wherein the light reception amount per unit time is obtained by dividing the light reception amount by an exposure time.

2. The optical measurement device according to claim 1, wherein the distance detector does not measure the distance when the portion of the target is detected by the light detector.

3. The optical measurement device according to claim 1, wherein
the light comprise a plurality of wavelength components, and
the optical measurement device comprises an optical system which generates a chromatic aberration along an optical axis direction in the light, irradiates the light in which the chromatic aberration is generated to the target, and condenses the reflected light, and
the light reception portion is capable of detecting the light reception amount for each wavelength component.

4. The optical measurement device according to claim 2, wherein
the light comprise a plurality of wavelength components, and
the optical measurement device comprises an optical system which generates a chromatic aberration along an optical axis direction in the light, irradiates the light in which the chromatic aberration is generated to the target, and condenses the reflected light, and
the light reception portion is capable of detecting the light reception amount for each wavelength component.

5. The optical measurement device according to claim 3, wherein
the distance detector measures the distance based on a light reception amount of a peak in a light reception amount distribution of each wavelength component of the reflected light.

6. The optical measurement device according to claim 3, comprising a setting portion which sets the threshold value based on the light reception amount per unit time of the reflected light, when the portion of the target is not detected by the light detector.

7. The optical measurement device according to claim 5, comprising a setting portion which sets the threshold value based on the light reception amount per unit time of the reflected light, when the portion of the target is not detected by the light detector.

8. The optical measurement device according to claim 6, wherein
when the portion of the target is not detected by the light detector, the setting portion sets $1/10$ of a light reception amount per unit time of the wavelength component of the peak in the light reception amount distribution of each wavelength component of the reflected light to be the threshold value; and
the light detector detects the portion of the target when the light reception amount per unit time of the wavelength component of the peak in the light reception amount distribution of each wavelength component of the reflected light is smaller than the threshold value.

9. An optical measurement method used by an optical measurement device, comprising following steps:
emitting light by a light source;
detecting a light reception amount of reflected light reflected on a target by a light reception portion comprising a light reception sensor;

a measurement step, measuring a distance from the optical measurement device to the target based on the light reception amount of the reflected light by a distance detector; and detecting a portion of the target in which a light reception amount per unit time of the reflected light is smaller than a threshold value by a light detector, wherein the light reception amount per unit time is obtained by dividing the light reception amount by an exposure time.

10. The optical measurement method according to claim 9, wherein the measurement step includes that when the portion of the target is detected by the light detector in the step of detecting the portion of the target, the distance detector does not measure the distance.

11. The optical measurement method according to claim 9, wherein the light comprise a plurality of wavelength components, and the optical measurement method comprises generating a chromatic aberration along an optical axis direction in the light, irradiating the light in which the chromatic aberration is generated to the target, and condensing the reflected light by an optical system, and the light reception portion is capable of detecting the light reception amount for each wavelength component.

12. The optical measurement method according to claim 10, wherein the light comprise a plurality of wavelength components, and the optical measurement method comprises generating a chromatic aberration along an optical axis direction in the light, irradiating the light in which the chromatic aberration is generated to the target, and condensing the reflected light by an optical system, and the light reception portion is capable of detecting the light reception amount for each wavelength component.

13. The optical measurement method according to claim 11, wherein the measurement step includes measuring the distance based on the light reception amount of the peak in the light reception amount distribution of each wavelength component of the reflected light by the distance detector.

14. The optical measurement method according to claim 11, comprising a setting step of setting the threshold value based on the light reception amount per unit time of the reflected light by a setting portion, when the portion of the target is not detected by the light detector in the step of detecting the portion of the target.

15. The optical measurement method according to claim 13, comprising a setting step of setting the threshold value based on the light reception amount per unit time of the reflected light by a setting portion, when the portion of the target is not detected by the light detector in the step of detecting the portion of the target.

16. The optical measurement method according to claim 14, wherein the setting step includes that when the portion of the target is not detected by the light detector in the step of detecting the portion of the target, the setting portion sets $1/10$ of the light reception amount per unit time of the wavelength component of the peak in the light reception amount distribution of each wavelength component of the reflected light to be the threshold value; and the step of detecting the portion of the target includes that the light detector detects the portion of the target when the light reception amount per unit time of the wavelength component of the peak in the light reception amount distribution of each wavelength component of the reflected light is smaller than the threshold value.

* * * * *